(12) United States Patent
Srinivasan

(10) Patent No.: US 9,996,935 B2
(45) Date of Patent: Jun. 12, 2018

(54) SYSTEMS AND METHODS OF DYNAMIC IMAGE SEGMENTATION

(71) Applicant: EDAN INSTRUMENTS, INC., Shenzhen (CN)

(72) Inventor: Seshadri Srinivasan, Sunnyvale, CA (US)

(73) Assignee: EDAN INSTRUMENTS, INC., Shenzhen (CN)

( * ) Notice: Subject to any disclaimer, the term of this patent is extended or adjusted under 35 U.S.C. 154(b) by 67 days.

(21) Appl. No.: 14/852,469

(22) Filed: Sep. 11, 2015

(65) Prior Publication Data

US 2016/0104292 A1   Apr. 14, 2016

Related U.S. Application Data

(60) Provisional application No. 62/062,737, filed on Oct. 10, 2014.

(51) Int. Cl.
*G06K 9/00* (2006.01)
*G06T 7/00* (2017.01)
(Continued)

(52) U.S. Cl.
CPC .............. *G06T 7/0081* (2013.01); *G06K 9/46* (2013.01); *G06T 5/00* (2013.01); *G06T 7/0012* (2013.01);
(Continued)

(58) Field of Classification Search
None
See application file for complete search history.

(56) References Cited

U.S. PATENT DOCUMENTS 5,204,625 A    4/1993  Cline et al.
5,215,094 A *  6/1993  Franklin ............. G01S 15/8909
                                                    600/454
(Continued)

FOREIGN PATENT DOCUMENTS

WO    WO 2009013636 A2 *  1/2009  ........... G06T 7/0012

OTHER PUBLICATIONS

International Search Report issued in related International Patent Application No. PCT/US2015/052659, dated Dec. 18, 2015.
(Continued)

*Primary Examiner* — Matthew Bella
*Assistant Examiner* — Jose M Torres
(74) *Attorney, Agent, or Firm* — Gilberto M. Villacorta; Brett P. Belden; Foley & Lardner LLP

(57) ABSTRACT

An ultrasound processing system includes an ultrasound interface, processing electronics, and display electronics. The ultrasound interface receives imaging information. The processing electronics are coupled to the ultrasound interface and configured to utilize the ultrasound imaging information to process an ultrasound scene for display. The processing electronics parse the scene into segments based on a plurality of automatically detected image characteristics and dynamically assign different processing parameters to different segments. Display electronics are coupled to the processing electronics and the processing electronics are configured to cause the display electronics to output the processed ultrasound scene.

19 Claims, 11 Drawing Sheets

(51) Int. Cl.
  *G06K 9/46* (2006.01)
  *G06T 5/00* (2006.01)
  *G06T 7/20* (2017.01)
(52) U.S. Cl.
  CPC ........ *G06T 7/20* (2013.01); *G06K 2009/4666* (2013.01); *G06T 2207/10132* (2013.01); *G06T 2207/20012* (2013.01); *G06T 2207/20112* (2013.01)

(56) References Cited

U.S. PATENT DOCUMENTS

| | | | |
|---|---|---|---|
| 5,622,174 A * | 4/1997 | Yamazaki | A61B 8/463 600/441 |
| 6,058,322 A * | 5/2000 | Nishikawa | G06T 7/0012 128/925 |
| 6,312,385 B1 * | 11/2001 | Mo | A61B 5/1075 600/443 |
| 6,463,167 B1 * | 10/2002 | Feldman | G06T 7/0012 382/128 |
| 6,575,910 B2 | 6/2003 | Averkiou et al. | |
| 6,579,238 B1 | 6/2003 | Simopoulos et al. | |
| 7,822,231 B2 | 10/2010 | Coimbra et al. | |
| 7,995,828 B2 * | 8/2011 | Wang | G06T 7/0002 378/28 |
| 8,509,506 B2 | 8/2013 | Ciofolo et al. | |
| 2005/0131300 A1 | 6/2005 | Bakircioglu et al. | |
| 2006/0079778 A1 | 4/2006 | Mo et al. | |
| 2007/0016024 A1 * | 1/2007 | Simopoulos | A61B 8/08 600/437 |
| 2007/0065009 A1 * | 3/2007 | Ni | G01S 7/52034 382/173 |
| 2008/0008369 A1 * | 1/2008 | Koptenko | G06K 9/4604 382/128 |
| 2008/0269611 A1 * | 10/2008 | Pedrizzetti | A61B 8/06 600/454 |
| 2010/0158332 A1 * | 6/2010 | Rico | A61B 5/4312 382/128 |
| 2010/0189346 A1 * | 7/2010 | Ni | G01S 7/52034 382/164 |
| 2010/0260398 A1 | 10/2010 | Ma et al. | |
| 2012/0071758 A1 | 3/2012 | Lachaine et al. | |
| 2012/0183191 A1 * | 7/2012 | Nakamura | A61B 5/416 382/128 |
| 2013/0046168 A1 | 2/2013 | Sui | |
| 2013/0308849 A1 * | 11/2013 | Fei | G06T 7/168 382/131 |
| 2014/0052001 A1 | 2/2014 | Ionasec et al. | |
| 2014/0328529 A1 * | 11/2014 | Koceski | G06T 7/136 382/131 |
| 2015/0063649 A1 * | 3/2015 | Mihalef | G06T 7/20 382/107 |
| 2015/0099990 A1 * | 4/2015 | Liang | A61B 5/02007 600/508 |
| 2015/0178938 A1 * | 6/2015 | Gorman, III | G06T 7/0087 382/131 |

OTHER PUBLICATIONS

Written Opinion issued in related International Patent Application No. PCT/US2015/052659, dated Dec. 18, 2015.
International Preliminary Report on Patentability issued in related International Patent Application No. PCT/US2015/052659, dated Apr. 11, 2017.
Extended European Search Report issued in related European Patent Application No. 15848289, dated Feb. 22, 2018.

* cited by examiner

| Computed imaging feature | | Imaging parameter to change | | |
| --- | --- | --- | --- | --- |
| Local brightness | Local orientation | Dynamic range | Persistence | Spatial Filter |
| Low | Low | Low | High | High |
| Low | Medium | Low | Medium | Directional filter |
| Low | High | Low | Low | Directional filter |
| Medium | Low | High | Medium | Medium |
| Medium | Medium | Medium | Medium | Medium |
| Medium | High | Low | Low | Directional filter |
| High | Low | Medium | Medium | Directional filter |
| High | Medium | Low | Medium | Directional filter |
| High | High | Low | Low | Directional filter |

FIG. 3

| Segmented imaging feature | | | | Tissue type identified | Imaging view identified | Imaging parameter to change | | |
| --- | --- | --- | --- | --- | --- | --- | --- | --- |
| Regional area | Regional shape | Structure brightness | Structure speckle content | | | Dynamic range | Persistence | Spatial filter |
| Small/ Medium | Elongated/ Circular/ Tubular/ Elliptical/ Irregular | Low/ Medium/ High | Low/Medium/ High | Carotid/ Thyroid/Liver/ Kidney/Heart/ Thigh/Calf/ etc. | LongAxis/ ShortAxis/4- chamber/etc. | Low/ Medium/ High | Low/ Medium/ High | Low/ Medium/ High |

FIG. 4

SYSTEMS AND METHODS OF DYNAMIC IMAGE SEGMENTATION

CROSS REFERENCE TO RELATED APPLICATION

The present application claims the benefit of and priority to U.S. Provisional Patent Application No. 62/062,737, filed Oct. 10, 2014, which is hereby incorporated by reference herein in its entirety.

BACKGROUND

The present disclosure relates generally to medical imaging devices. More particularly, the present disclosure relates to medical image processing systems and methods.

Medical imaging systems and devices are used to observe, identify, and examine internal aspects of a patient. One conventional system is ultrasonography (i.e., ultrasound imaging systems). As applied to medical imaging, ultrasound imaging systems have a wide range of uses: from during gestation to observe fetal development to the examination of sports-related injuries (e.g., a torn anterior cruciate ligament), and many others. Ultrasound imaging systems have wide applicability that provide physicians with a non-invasive diagnostic and prognostic tool.

Ultrasound imaging systems utilize high frequency sound transducers that produce high frequency sound waves. The high frequency sound waves are able to penetrate a patient and impact their organs, bones, blood, etc. Upon impact, the organs, bones, blood, etc. ricochet the sound waves back to the transducer where the ricocheted sound waves (i.e., echoes) are transformed into an ultrasound image. Conventional ultrasound imaging systems have several signal and image processing stages where the post-detection imaging parameters such as gain, dynamic range, persistence, compounding and spatial filters are set to either constant or variable values. The result of such filters is an attempt to generate a relatively clear image. However, often times, the image contains a relatively high amount of noise (e.g., electrostatic frequency) that renders portions of the image unclear. As a result, many physicians have to acquire additional ultrasound images, which leads to more time and a relatively higher cost.

BRIEF DESCRIPTION OF THE DRAWINGS

FIG. 3 is a logic table for the method of FIG. 2, according to one embodiment.

FIG. 4 is another logic table for the method of FIG. 2, according to another embodiment.

DETAILED DESCRIPTION OF THE PREFERRED EMBODIMENTS

Figure 1:
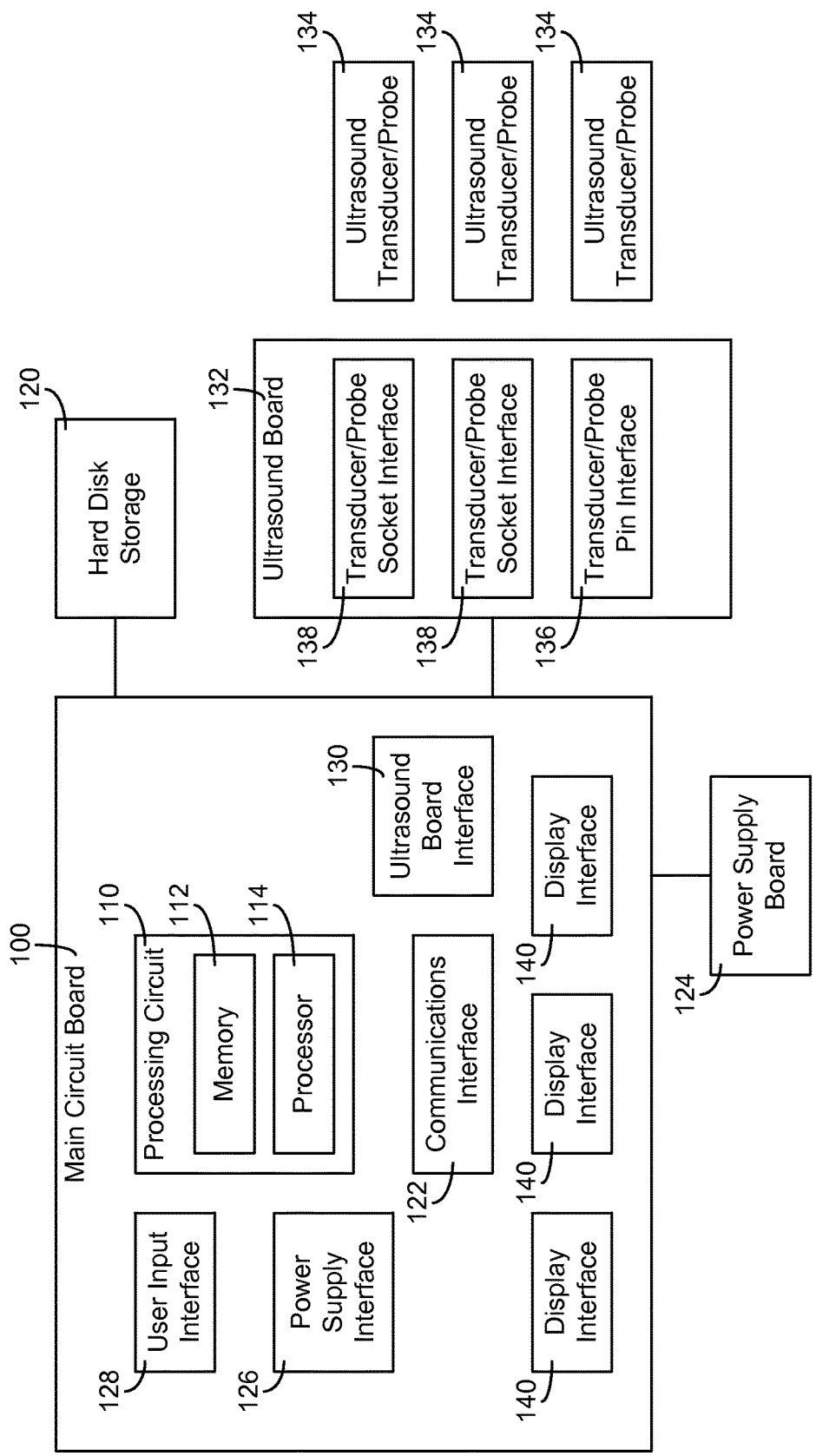
FIG. 1 is a block diagram illustrating components of one embodiment of a portable ultrasound system.

Before turning to the Figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Referring to the Figures generally, the various embodiments disclosed herein relate to systems and methods of dynamic image segmentation in ultrasonography imaging systems. According to the present disclosure, an image processing system is structured to receive an image from an image acquisition device (e.g., a high frequency sound transducer for the ultrasonography system), segment the image into one or more regions based on one or more image characteristics (e.g., local brightness, local gradients, etc.), and subsequently dynamically adapt post-detection imaging parameters (e.g., gain, dynamic range, etc.) as a function of the segments. Advantageously, the result is each different segment within the image being optimized for, e.g., clarity. An example of the present disclosure is as follows. An ultrasound technician applies the transducer to a region of interest of a patient. The transducer acquires an image that consists of soft tissue (e.g., liver), flow regions (e.g., veins), muscle or fat portions, etc. Each of these portions may correspond with different image characteristics (e.g., a brightness, a gradient, a flow velocity, etc.). Accordingly, blindly applying the post-detection imaging parameters may result in some optimized segments and some noise-filled (e.g., blurry) segments within the image. This may complicate diagnosis and observation of various portions within the segment. According to the present disclosure, the image processing system uses a segmentation system (described herein) to identify each different portion and then optimizes the imaging parameters for each segment. As a result, a relatively clearer image is obtained. This may result in a relatively more efficient acquisition and examination of the image.

While the present disclosure is described generally above, it is important to note that the present disclosure is widely applicable. For example, the ultrasonography imaging may be used with a B-mode image, a Color Doppler image, and/or a Pulse Wave (PW) image. For B-mode imaging, the segments may be identified using the local gradients, local brightness, tissue area, shape, and speckle content. For Color and Spectral Doppler imaging, the segments may be identified using flow orientation, flow size, flow gradients, flow velocity, and flow strength parameters. Each of these examples is described more fully herein. Wavelets or Gabor transforms or morphological image processing methods can be utilized for the segmentation. At least some of the benefits of this system and method include a) automatic dynamic range and signal-to-noise (SNR) compensation, b) tissue adaptive and motion compensated persistence, c) flow adaptive thresholding, and persistence and spatial smoothing in color and spectral Doppler. While only a few benefits are described above, it should be apparent to those skilled in the art that many other benefits may be gained via the system and method of the present disclosure. Moreover, while the dynamic image segmentation is described primarily in regard to ultrasonography imaging systems, it should also be understood that this is only one example embodiment. The systems and methods of the present disclosure may be utilized in other imaging system environments (e.g., magnetic resonance imaging) without departing from the spirit and scope of the present disclosure.

Referring now to FIG. 1, a block diagram shows internal components of one embodiment of a portable ultrasound system. The portable ultrasound system includes main circuit board 100. Main circuit board 100 carries out computing tasks to support the functions of the portable ultrasound system and provides connection and communication between various components of the portable ultrasound system. In some embodiments, main circuit board 100 is configured so as to be a replaceable and/or upgradable module.

To perform computational, control, and/or communication tasks, main circuit board 100 includes processing circuit 110. The processing circuit 110 is structured to receive one or more signals from ultrasound board interface 130 to generate the image. The processing circuit 110 is structured to segment the image and optimize the imaging parameters for each segment. An example method of the dynamic image segmentation is shown in regard to FIG. 2 herein. The processing circuit 110 then transmits the image to the display interface 140 for a user to observe the image, and communications interface 122. Communication between and among the components of FIG. 1 may be via any number of wired or wireless connections. For example, a wired connection may include a serial cable, a fiber optic cable, a CAT5 cable, or any other form of wired connection. In comparison, a wireless connection may include the Internet, Wi-Fi, cellular, radio, etc. In one embodiment, a controller area network (CAN) bus provides the exchange of signals, information, and/or data. The CAN bus includes any number of wired and wireless connections.

Processor 114 may be, or may include, one or more microprocessors, application specific integrated circuits (ASICs), circuits containing one or more processing components, a group of distributed processing components, circuitry for supporting a microprocessor, or other hardware configured for processing. Processor 114 is configured to execute computer code. The computer code may be stored in memory 112 to complete and facilitate the activities described herein with respect to a portable ultrasound system. In other embodiments, the computer code may be retrieved and provided to processor 114 from hard disk storage 120 or communications interface 122 (e.g., the computer code may be provided from a source external to main circuit board 100).

Memory 112 may be any volatile or non-volatile computer-readable storage medium capable of storing data or computer code relating to the activities described herein. For example, memory 112 may include modules which are computer code modules (e.g., executable code, object code, source code, script code, machine code, etc.) configured for execution by processor 114. Memory 112 may include computer executable code related to functions including ultrasound imagining, battery management, handling user inputs, displaying data, transmitting and receiving data using a wireless communication device, etc. In some embodiments, processing circuit 110 may represent a collection of multiple processing devices (e.g., multiple processors, etc.). In such cases, processor 114 represents the collective processors of the devices and memory 112 represents the collective storage devices of the devices. When executed by processor 114, processing circuit 110 is configured to complete the activities described herein as associated with a portable ultrasound system.

Hard disk storage 120 may be a part of memory 112 and/or used for non-volatile long term storage in a portable ultrasound system. Hard disk storage 120 may store local files, temporary files, ultrasound images, patient data, an operating system, executable code, and any other data for supporting the activities of the portable ultrasound device described herein. In some embodiments, hard disk storage 120 is embedded on main circuit board 100. In other embodiments, hard disk storage 120 is located remote from main circuit board 100 and coupled thereto to allow for the transfer of data, electrical power, and/or control signals. Hard disk storage 120 may be an optical drive, magnetic drive, a solid state hard drive, flash memory, etc.

In some embodiments, main circuit board 100 includes communications interface 122. Communications interface 122 may include connections which enable communication between components of main circuit board 100 and communications hardware. For example, communications interface 122 may provide a connection between main circuit board 100 and a network device (e.g., a network card, a wireless transmitter/receiver, etc.). In further embodiments, communications interface 122 may include additional circuitry to support the functionality of attached communications hardware or to facilitate the transfer of data between communications hardware and main circuit board 100. In other embodiments, communications interface 122 may be a system on a chip (SOC) or other integrated system which allows for transmission of data and reception of data. In such a case, communications interface 122 may be coupled directly to main circuit board 100 as either a removable package or embedded package.

Some embodiments of a portable ultrasound system include power supply board 124. Power supply board 124 includes components and circuitry for delivering power to components and devices within and/or attached to a portable ultrasound system. In some embodiments, power supply board 124 includes components for alternating current and direct current conversion, for transforming voltage, for delivering a steady power supply, etc. These components may include transformers, capacitors, modulators, etc. to perform the above functions. In further embodiments, power supply board 124 includes circuitry for determining the available power of a battery power source. In other embodiments, power supply board 124 may receive information regarding the available power of a battery power source from circuitry located remote from power supply board 124. For example, this circuitry may be included within a battery. In some embodiments, power supply board 124 includes circuitry for switching between power sources. For example, power supply board 124 may draw power from a backup battery while a main battery is switched. In further embodiments, power supply board 124 includes circuitry to operate as an uninterruptable power supply in conjunction with a backup battery. Power supply board 124 also includes a connection to main circuit board 100. This connection may allow power supply board 124 to send and receive information from main circuit board 100. For example, power supply board 124 may send information to main circuit board 100 allowing for the determination of remaining battery power. The connection to main circuit board 100 may also allow main circuit board 100 to send commands to power supply board 124. For example, main circuit board 100 may send a command to power supply board 124 to switch from one source of power to another (e.g., to switch to a backup battery while a main battery is switched). In some embodiments, power supply board 124 is configured to be a module. In such cases, power supply board 124 may be configured so as to be a replaceable and/or upgradable module. In some embodiments, power supply board 124 is or includes a power supply unit. The power supply unit may convert AC power to DC power for use in a portable ultrasound system. The power supply may perform additional functions such as short circuit protection, overload protection, undervoltage protection, etc. The power supply may conform to ATX specification. In other embodiments, one or more of the above described functions may be carried out by main circuit board 100.

Main circuit board 100 may also include power supply interface 126 which facilitates the above described communication between power supply board 124 and main circuit board 100. Power supply interface 126 may include connections which enable communication between components of main circuit board 100 and power supply board 124. In further embodiments, power supply interface 126 includes additional circuitry to support the functionality of power supply board 124. For example, power supply interface 126 may include circuitry to facilitate the calculation of remaining battery power, manage switching between available power sources, etc. In other embodiments, the above described functions of power supply board 124 may be carried out by power supply interface 126. For example, power supply interface 126 may be a SOC or other integrated system. In such a case, power supply interface 126 may be coupled directly to main circuit board 100 as either a removable package or embedded package.

With continued reference to FIG. 1, some embodiments of main circuit board 100 include user input interface 128. User input interface 128 may include connections which enable communication between components of main circuit board 100 and user input device hardware. For example, user input interface 128 may provide a connection between main circuit board 100 and a capacitive touchscreen, resistive touchscreen, mouse, keyboard, buttons, and/or a controller for the proceeding. In one embodiment, user input interface 128 couples controllers for a touchpad, a touchscreen, and a main screen to main circuit board 100. In other embodiments, user input interface 128 includes controller circuitry for a touchpad, a touchscreen, and a main screen. In some embodiments, main circuit board 100 includes a plurality of user input interfaces 128. For example, each user input interface 128 may be associated with a single input device (e.g., a touchpad, a touchscreen, a keyboard, buttons, etc.).

In further embodiments, user input interface 128 may include additional circuitry to support the functionality of attached user input hardware or to facilitate the transfer of data between user input hardware and main circuit board 100. For example, user input interface 128 may include controller circuitry so as to function as a touchscreen controller. User input interface 128 may also include circuitry for controlling haptic feedback devices associated with user input hardware. In other embodiments, user input interface 128 may be a SOC or other integrated system which allows for receiving user inputs or otherwise controlling user input hardware. In such a case, user input interface 128 may be coupled directly to main circuit board 100 as either a removable package or embedded package.

Main circuit board 100 may also include ultrasound board interface 130 which facilitates communication between ultrasound board 132 and main circuit board 100. Ultrasound board interface 130 may include connections which enable communication between components of main circuit board 100 and ultrasound board 132. In further embodiments, ultrasound board interface 130 includes additional circuitry to support the functionality of ultrasound board 132. For example, ultrasound board interface 130 may include circuitry to facilitate the calculation of parameters used in generating an image from ultrasound data provided by ultrasound board 132. In some embodiments, ultrasound board interface 130 is a SOC or other integrated system. In such a case, ultrasound board interface 130 may be coupled directly to main circuit board 100 as either a removable package or embedded package.

In other embodiments, ultrasound board interface 130 includes connections which facilitate use of a modular ultrasound board 132. Ultrasound board 132 may be a module (e.g., ultrasound module) capable of performing functions related to ultrasound imaging (e.g., multiplexing sensor signals from an ultrasound probe/transducer, controlling the frequency of ultrasonic waves produced by an ultrasound probe/transducer, etc.). The connections of ultrasound board interface 130 may facilitate replacement of ultrasound board 132 (e.g., to replace ultrasound board 132 with an upgraded board or a board for a different application). For example, ultrasound board interface 130 may include connections which assist in accurately aligning ultrasound board 132 and/or reducing the likelihood of damage to ultrasound board 132 during removal and/or attachment (e.g., by reducing the force required to connect and/or remove the board, by assisting, with a mechanical advantage, the connection and/or removal of the board, etc.).

In embodiments of a portable ultrasound system including ultrasound board 132, ultrasound board 132 includes components and circuitry for supporting ultrasound imaging functions of a portable ultrasound system. In some embodiments, ultrasound board 132 includes integrated circuits, processors, and memory. Ultrasound board 132 may also include one or more transducer/probe socket interfaces 138. Transducer/probe socket interface 138 enables ultrasound transducer/probe 134 (e.g., a probe with a socket type connector) to interface with ultrasound board 132. For example, transducer/probe socket interface 138 may include circuitry and/or hardware connecting ultrasound transducer/probe 134 to ultrasound board 132 for the transfer of electrical power and/or data. Transducer/probe socket interface 138 may include hardware which locks ultrasound transducer/probe 134 into place (e.g., a slot which accepts a pin on ultrasound transducer/probe 134 when ultrasound transducer/probe 134 is rotated). In some embodiments, ultrasound board 132 includes multiple transducer/probe socket interfaces 138 to allow the connection of multiple socket type ultrasound transducers/probes.

In some embodiments, ultrasound board 132 also includes one or more transducer/probe pin interfaces 136. Transducer/probe pin interface 136 enables an ultrasound transducer/probe 134 with a pin type connector to interface with ultrasound board 132. Transducer/probe pin interface 136 may include circuitry and/or hardware connecting ultrasound transducer/probe 134 to ultrasound board 132 for the transfer of electrical power and/or data. Transducer/probe pin interface 136 may include hardware which locks ultrasound transducer/probe 134 into place. In some embodiments, ultrasound board 132 includes more than one transducer/probe pin interfaces 136 to allow the connection of two or more pin type ultrasound transducers/probes 134. In further embodiments, ultrasound board 132 may include interfaces for additional types of transducer/probe connections.

With continued reference to FIG. 1, some embodiments of main circuit board 100 include display interface 140. Display interface 140 may include connections which enable communication between components of main circuit board 100 and display device hardware. For example, display interface 140 may provide a connection between main circuit board 100 and a liquid crystal display, a plasma display, a cathode ray tube display, a light emitting diode display, and/or a display controller or graphics processing unit for the proceeding or other types of display hardware. In some embodiments, the connection of display hardware to main circuit board 100 by display interface 140 allows a processor or dedicated graphics processing unit on main circuit board 100 to control and/or send data to display hardware. Display interface 140 may be configured to send display data to display device hardware in order to produce an image. In some embodiments, main circuit board 100 includes multiple display interfaces 140 for multiple display devices (e.g., three display interfaces 140 connect three displays to main circuit board 100). In other embodiments, one display interface 140 may connect and/or support multiple displays. In one embodiment, three display interfaces 140 couple a touchpad, a touchscreen, and a main screen to main circuit board 100.

In further embodiments, display interface 140 may include additional circuitry to support the functionality of attached display hardware or to facilitate the transfer of data between display hardware and main circuit board 100. For example, display interface 140 may include controller circuitry, a graphics processing unit, video display controller, etc. In some embodiments, display interface 140 may be a SOC or other integrated system which allows for displaying images with display hardware or otherwise controlling display hardware. Display interface 140 may be coupled directly to main circuit board 100 as either a removable package or embedded package. Processing circuit 110 in conjunction with one or more display interfaces 140 may display images on one or more of a touchpad, a touchscreen, and a main screen.

Figure 2:
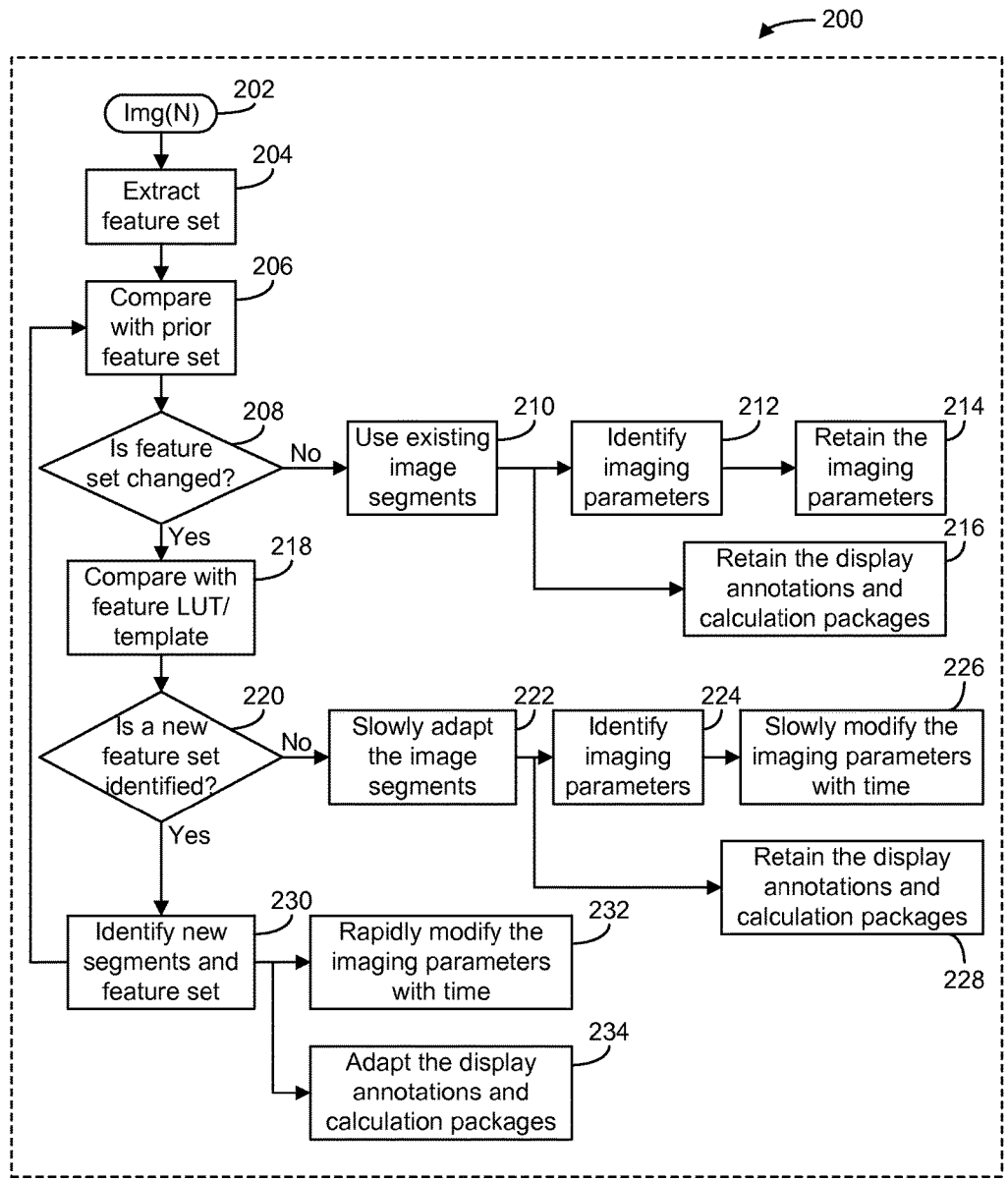
FIG. 2 is a flowchart of a method of dynamic image segmentation for the portable ultrasound system of FIG. 1, according to one embodiment.

Referring now to FIG. 2, a flowchart of a method 200 of dynamic image segmentation is shown according to one embodiment. According to one embodiment, the method 200 may be implemented with the processing circuit 110. Accordingly, reference to the system 110 may be used to aid explanation of the method 200.

While described below as a dynamic implementation, it should be understood that method 200 (and the other methods disclosed) may also be applied to static images. As used herein, the term "static" (in regard to the method implementations) refers to the acquisition of the image followed by the image processing steps. In comparison, the term "dynamic" as used herein in regard to the method implementations refers to the image processing that occurs substantially simultaneously while the sound waves that make up the image are received. In this regard, there is little to no time lapse between the acquired image and the optimized-for-clarity image.

Generally speaking, the method 200 may be described as follows: Identify features from the image such as the local gradients, local brightness, and speckle content to aid image parameter selection (e.g., gain) and tissue-type identification. Segment the image based on the features of the image. Image segmentation methods may include, but are not limited to, wavelets, Gabor transforms, morphological image processing, and/or image frequency domain processing. Extract at least one image feature from the segmented images. The image feature (also referred to herein as an image characteristic) may include, but is not limited to, a size, an area, a relative location of the segments, a structure brightness, a speckle content, etc. Customize image to a desired enhancement and/or view based on the at least one image characteristic. Image customizations may be achieved via image enhancement, image parameter identification, and non-imaging aspects such as anatomy identification, workflow enhancements such as automatic fill-in of the data fields, identifying regions of interest (e.g., in Color Doppler such as a region of interest (ROI), position, size, steer; and in PW Doppler, such as Gate size, position, steer). Adapt image segments and image characteristics dynamically as a function of time with slow or fast changes depending on the rate of change of the characteristics and segments.

According to one embodiment, this general (and the specific version shown in FIG. 2) embodiment of the method 200 may be utilized with at least two different image versions. The image versions refer to a tissue version and a flow version. In one example, the tissue version includes features, such as tissues and muscles, while the flow version includes features, such as the movement of blood and the pulsing of muscles. Thus, the demarcation between the two versions identifies the fact that the method 200 may be utilized with moving and relatively more static features of the image.

Referring now more particularly to FIG. 2, method 200 is initiated by an image acquisition (process 202). Features are extracted from the image (process 204). The features refer to the image characteristics described above. Accordingly, the features may include a size, an area, a relative location of the segments, structure brightness, a speckle content, etc. The extracted feature set is compared with a prior feature set (process 206). At process 206, the processing circuit 110 may use one or more algorithms, processes, formulas, and the like to determine a degree of similarity between the feature sets. At process 208, a determination is made whether the feature set changed. This determination may be based on the degree of similarity between the feature sets. For example, if the brightness content at particular locations are within five percent of each other, the processing circuit 110 may determine that the feature set has not changed. However, if the local gradients differ by more than ten percent at particular locations, the processing circuit 110 may determine that the feature set has changed. The specification of whether there has been a change in the feature sets is highly configurable. In some embodiments, the determination is based on one feature or image characteristics. In other embodiments, the determination is based on a plurality of feature of image characteristics. Due to its high configurability, this process may differ for each application (e.g., during B-mode imaging versus Doppler mode imaging). All such variations are intended to fall within the spirit and scope of the present disclosure.

If the feature set has not changed, the existing image segments are utilized (process 210). Utilizing those segments, imaging parameters are identified (process 212). The identified imaging parameters are retained (process 214) as are the display annotations and calculation packages (process 216). The imaging parameters are retained for future use. For example, if the feature set is determined to not have changed, the retained imaging parameters may be utilized to optimize each segment within the image for clarity. In turn, a relatively more efficient and quicker process may result. The display annotations and calculation packages are also retained. This refers to the processes utilized to generate the image. Like process 214, retaining the display annotations and calculation packages yield a relatively quicker image generation on the image providing device. Thus, processes 214 and 216 streamline the method 200 for future uses.

If the feature set has changed, the extracted feature set is compared against a feature set template (process 218). In one embodiment, the feature set template is structured as a look-up table (LUT). In other embodiments, the feature set template may be structured in any configuration that permits or substantially permits the segmentation of the image by the processing circuit 110 (e.g., via one or more formulas, algorithms, processes, numerical methods, user inputs, etc.). Application of the feature set templates is explained more fully in regard to FIGS. 3-8.

At process 220, a determination of whether a new feature set has been identified is made. The new feature set refers to a feature set that is not accounted for in the feature set template. For example, referring briefly to FIG. 3, an unrepresented feature set would indicate an unrepresented local brightness and local orientation value. If a new feature set has not been identified, the image segments are slowly adapted (process 222) and the imaging parameters are identified (process 224) and modified with time (process 226). Like process 216, the display annotations and calculation packages are retained for efficient future use (process 228). As explained more fully herein, processes 222-228 correspond with the alignment of the extracted feature sets with the various possibilities in the feature set templates (e.g., low local brightness and low local orientation as in FIG. 3) followed by the application of the associated imaging parameters.

If a new feature set has been identified, an identification of new segments and feature sets (i.e., image characteristics) is made (process 230). These new segments and feature sets may be utilized in the future at process 206. Because these are newly identified segments and feature sets, the imaging parameters are rapidly modified (process 232). Whereas optimization of the imaging parameters is known for already-identified feature sets, optimization of non-identified feature sets is unknown at process 230; therefore a rapid modification is used in order to quickly and efficiently determine the level of various imaging parameters for each segment. This permits a relatively quick image segment clarity optimization. The resulting display annotations and calculation packages are adapted and retained for future use (process 234).

It should be understood that FIG. 2 depicts a generic embodiment of the dynamic image segmentation of the present disclosure. Specific methods for particular ultrasonography imaging modes are shown in regard to FIGS. 9-14.

Figures 5, 6:
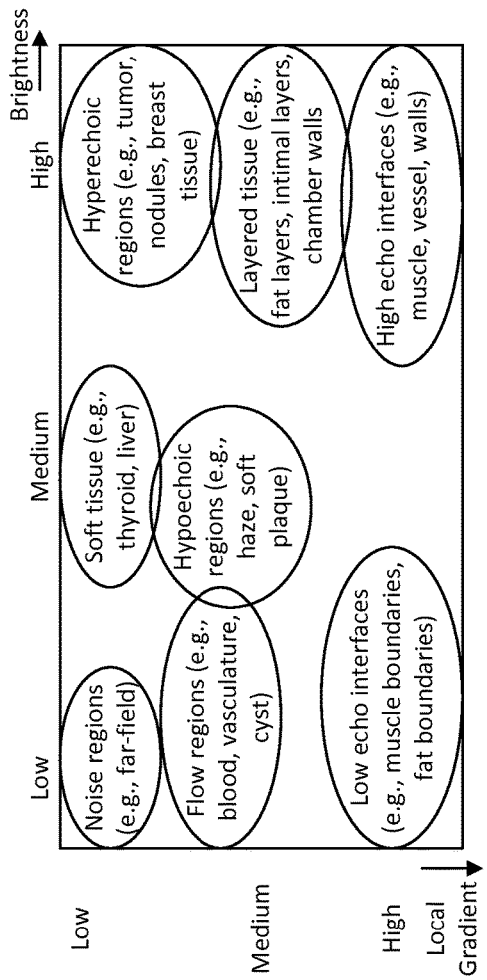
FIG. 5 illustrates an example image utilizing the dynamic image segmentation method of FIG. 2, according to one embodiment.
FIG. 6 is a Color Doppler and a Pulsed Wave Doppler logic table for the method of FIG. 2, according to one embodiment.

To aid explanation of method 200, FIGS. 3, 4, and 6 depict example feature set templates according to various embodiments. FIGS. 3, 4, and 6 show example feature sets and the corresponding imaging parameter adjustments for each feature set. In these example configurations, the feature set templates are structured as look-up tables.

As mentioned above, method 200 may be utilized with a tissue version and a flow version. FIGS. 3-4 depict example feature set templates for the tissue version while FIG. 6 depicts an example feature set template for the flow version.

FIG. 3 represents a two-dimensional image segment identification and optimization. In FIG. 3, the two features extracted are local brightness and local orientation. In the rows beneath the "local brightness" and "local orientation" titles, the various configurations are shown (e.g., a low local brightness and a medium local orientation, a medium local brightness and a high local orientation, etc.). The exact demarcations for what constitutes "low, medium, or high" values is based on a relative scale. Exact numerical representations (or other identifying characteristic) for each feature (e.g., low brightness is equal to brightness values less than or equal to X) may vary widely based on the application. It should be understood that the relative scale depicted herein in regard to FIGS. 3, 4, and 6 is meant to show one example implementation. Many other configurations with varying values/scales may also be utilized.

As shown in FIG. 3, the imaging parameters are adjusted based on the extracted local brightness and local orientation features. The imaging parameters refer to adjustable parameters/variables/coefficients used to decrease the relative noise (e.g., blurriness) in the image. Application of these parameters leads to an enhancement of each image segment corresponding to each particular feature set. The example imaging parameters in FIG. 3 are dynamic range, persistence, and spatial filter. In other embodiments, more, less, or different imaging parameters may be utilized. An example adjustment of the imaging parameters (i.e., processes 212 and 224 of FIG. 2) is as follows: for a determined low local brightness and low local orientation feature set, an adjustment to a low dynamic range, a high persistence, and a high spatial filter are implemented. Thus, for each combination of the two-dimensional image features, the processing circuit 110 adjusts the imaging parameters in accord with the determined two-dimensional image features.

FIG. 4 depicts a four-dimensional image feature optimization. In FIG. 4, the imaging features include regional area, regional shape, structure brightness, and structure speckle content. Based on the determined relative values for each imaging feature, the tissue type is identified and the imaging parameter to be adjusted is identified (e.g., processes 224 and 226). In operation, FIG. 4 would depict a series of rows with each combination of regional area, regional shape, structure brightness, and structure speckle content. For ease of explanation, the general embodiment is depicted instead in FIG. 4.

Thus, the use of FIGS. 3-4 enable the identification and enhancement of each image segment (via FIG. 3) and the identification of tissue type (via FIG. 4). Segmenting the image into tissue types helps in tissue adaptive processing. For example, depending on the dominant tissue of interest either a) the presets can be selected or b) the front-end imaging parameters can be adjusted. FIG. 5 shows one way of image segmentation. As shown, various segments of an image (e.g., soft tissue, layered tissue, etc.) are identified wherein imaging parameters for each segment is optimized appropriately via FIGS. 3-4. The image segmentation, according to FIG. 5, is determined based on brightness versus local gradient. For example, if the imaging object had high brightness, but low local gradient, a hyperechoic region would be identified for segmentation.

Figure 7:
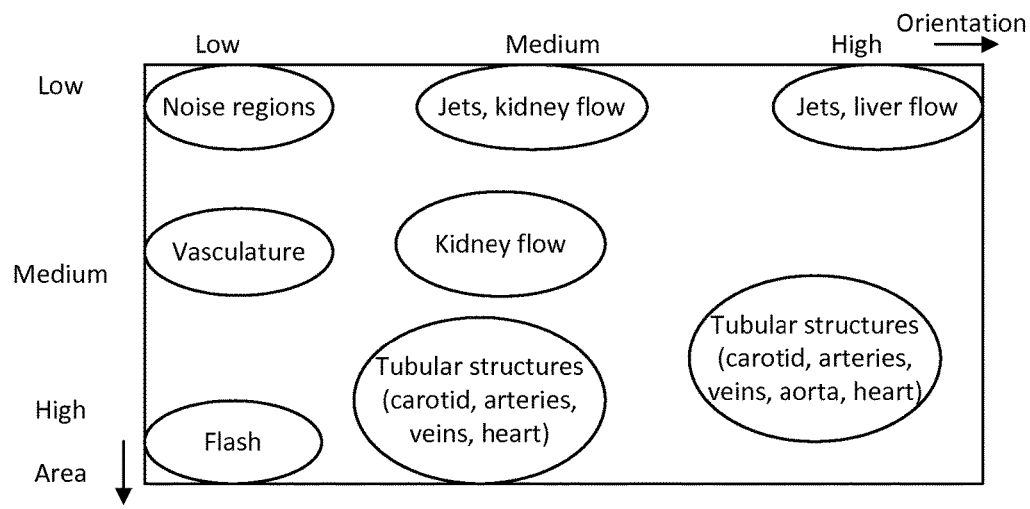
FIG. 7 illustrates an example image utilizing the dynamic image segmentation method of FIG. 2, according to another embodiment.
Figure 8:
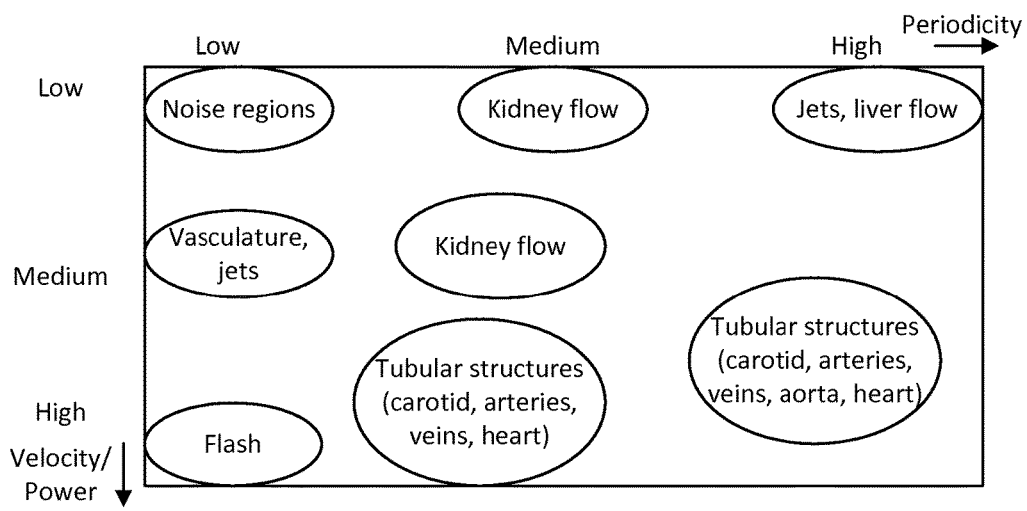
FIG. 8 illustrates an example image utilizing the dynamic image segmentation method of FIG. 2, according to still another embodiment.

FIG. 6 depicts a feature set template for the flow version. According to one embodiment, this table is utilized with Color Doppler and PW Doppler imaging. Application of the table is akin to that of FIGS. 3-4, however, FIG. 6 utilizes a six-dimensional image feature identifier: flow size, flow orientation (e.g., flow direction), flow gradient, flow time pattern, flow velocity, and flow strength. Based on the determined combination of these features, imaging parameters are adjusted (e.g. dynamic range, persistence, spatial filter, etc.). FIGS. 7-8 depict flow image segmentation. Based on the flow segmentation, as mentioned above, the imaging parameters can be selected and applied appropriately. Similar to FIG. 5, FIGS. 7-8 depict two dimensions of parameters. However, it should be understood that all six dimensions of image features are utilized when segmenting and changing imaging parameters.

It should be understood that FIGS. 5 and 7-8 provide only a few examples of the features. The feature set could include additional aspects such as the relative location of the features within the image as well as the arrangement of the features to provide a topography or view of the imaged region to characterize the imaging region of interest. All variations are intended to fall within the spirit and scope of the present disclosure.

With FIGS. 3-8 in mind, a summary of method 200 may be as follows. Images are acquired and feature sets are extracted. The feature sets refer to one or more image characteristics of the image (e.g., local brightness). The feature sets are used to identify various segments in the image (e.g., soft tissue, muscle, layered tissue) based on comparing the extracted feature sets to the template feature sets in, e.g., FIG. 4 and FIGS. 7-8. Based on the extracted feature sets relative to the feature set templates, one or more imaging parameters are adjusted to optimize the image segment corresponding with each extracted feature set. In this regard, the processing circuit 110 takes into account differences (e.g., brightness) in the image based on the image including a variety of organs, tissues, etc. and optimizes each image segment differently based on the features (i.e., characteristics) for that segment. In turn, a relatively higher degree of clarity may be achieved in the image due to its segmented optimization. Examining physicians, users, and the like may then be able to more effectively diagnose and observe the contents of each image, which may lead to time savings and a reduction in mis-diagnoses.

Figure 9:
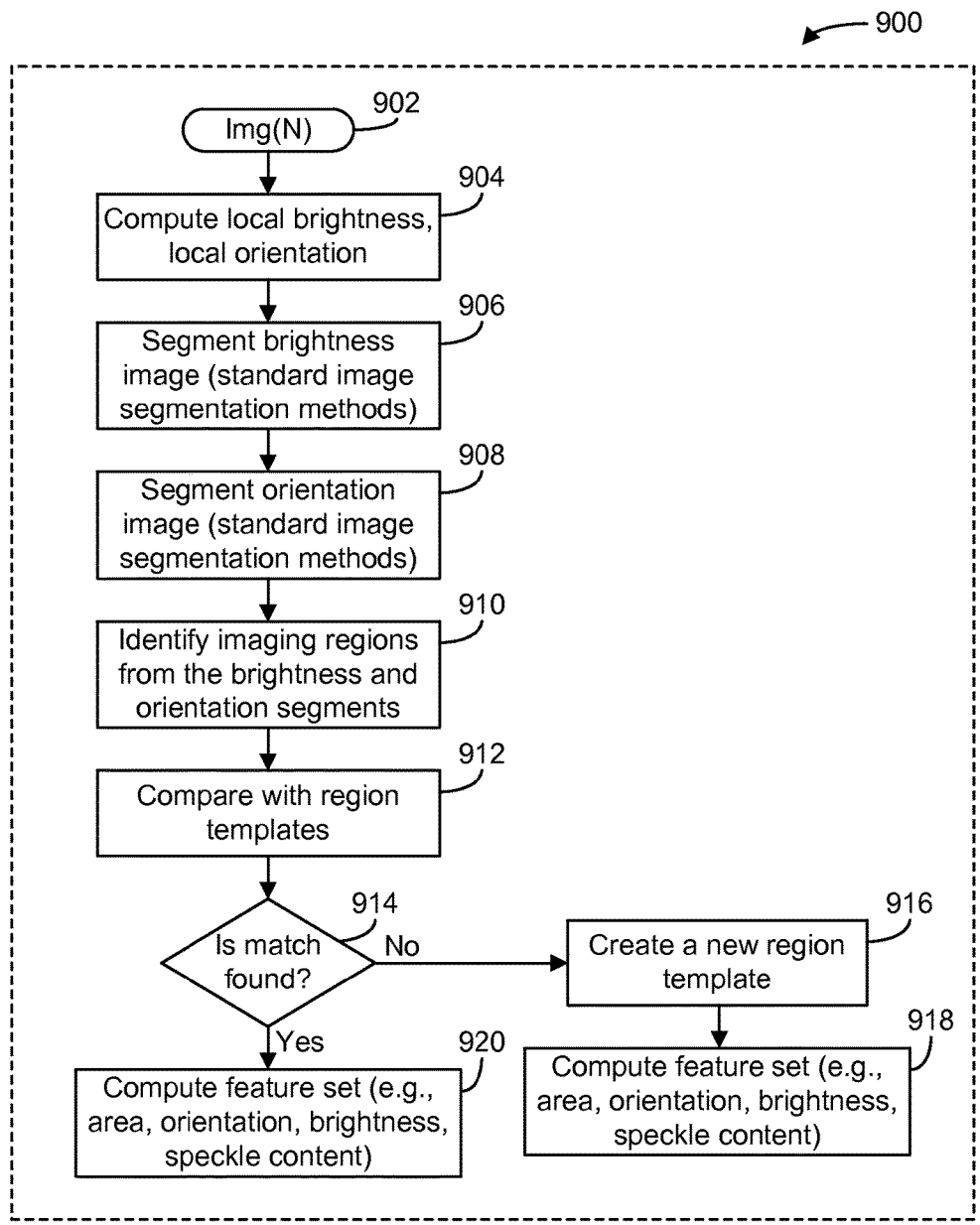
FIG. 9 is a flowchart of a method of extracting feature sets for B-mode imaging, according to one embodiment.
Figure 10:
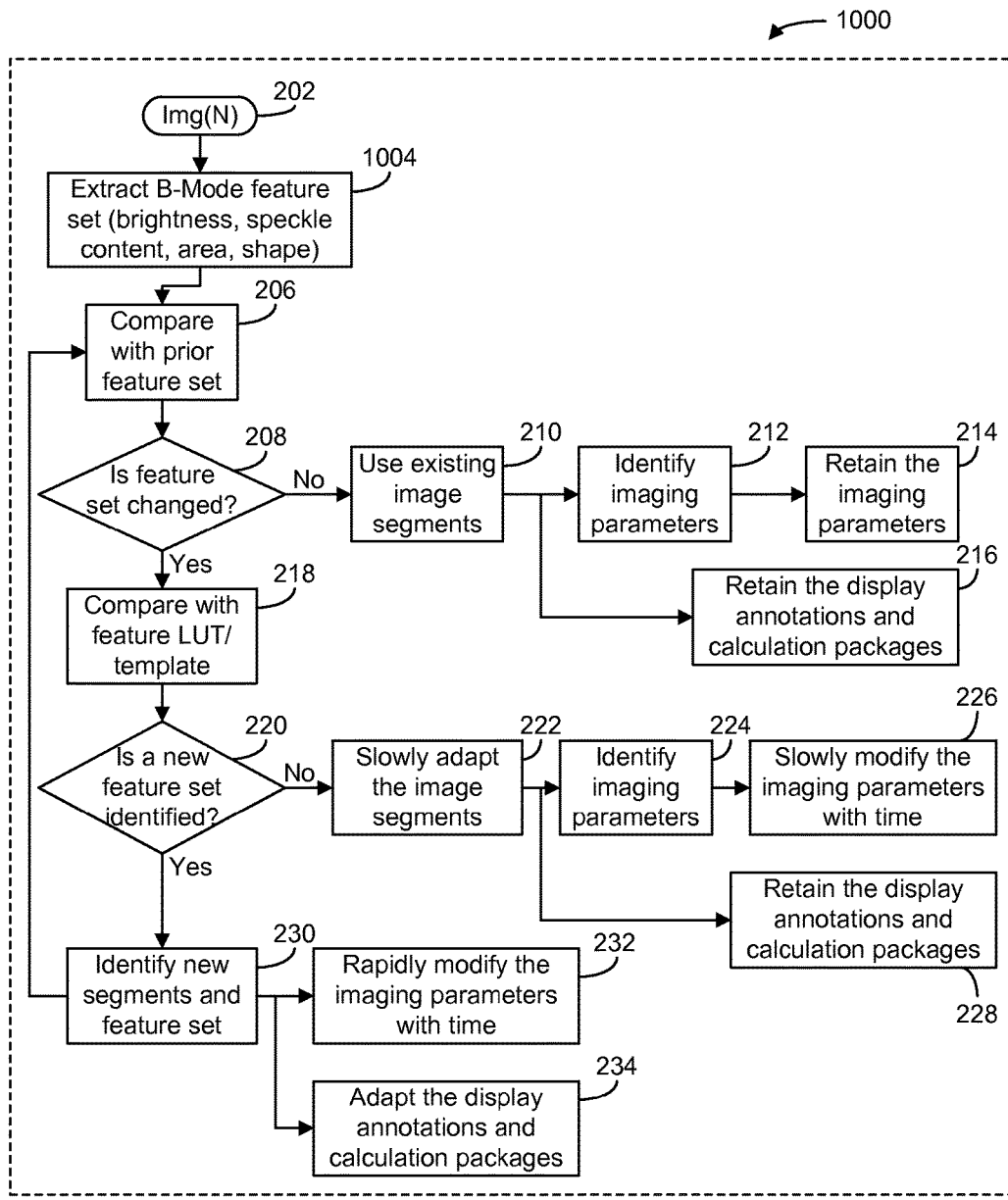
FIG. 10 is a flowchart of a method of dynamic image segmentation for B-mode processing, according to one embodiment.
Figure 11:
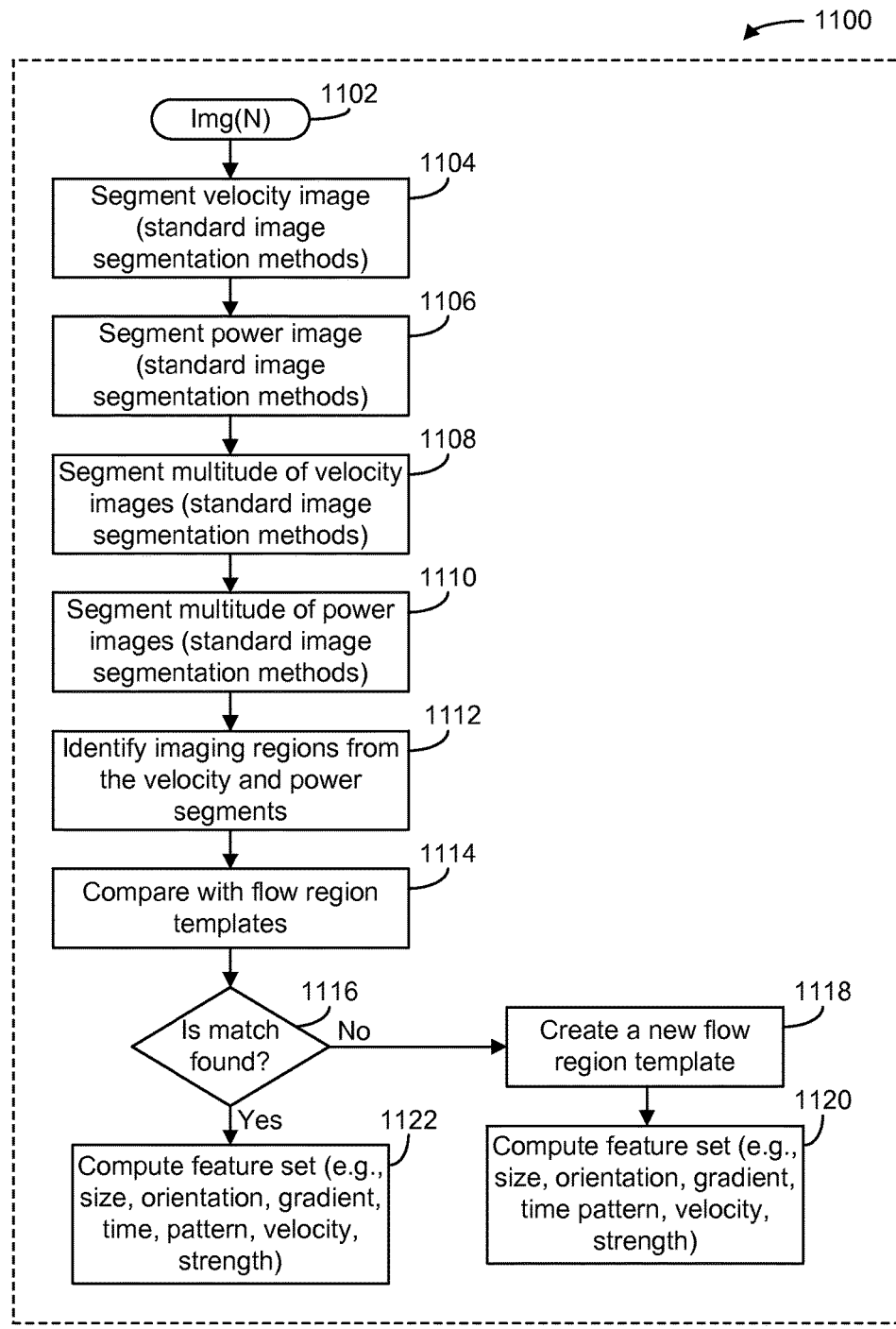
FIG. 11 is a flowchart of a method of extracting feature sets for Color Mode imaging, according to one embodiment.
Figure 12:
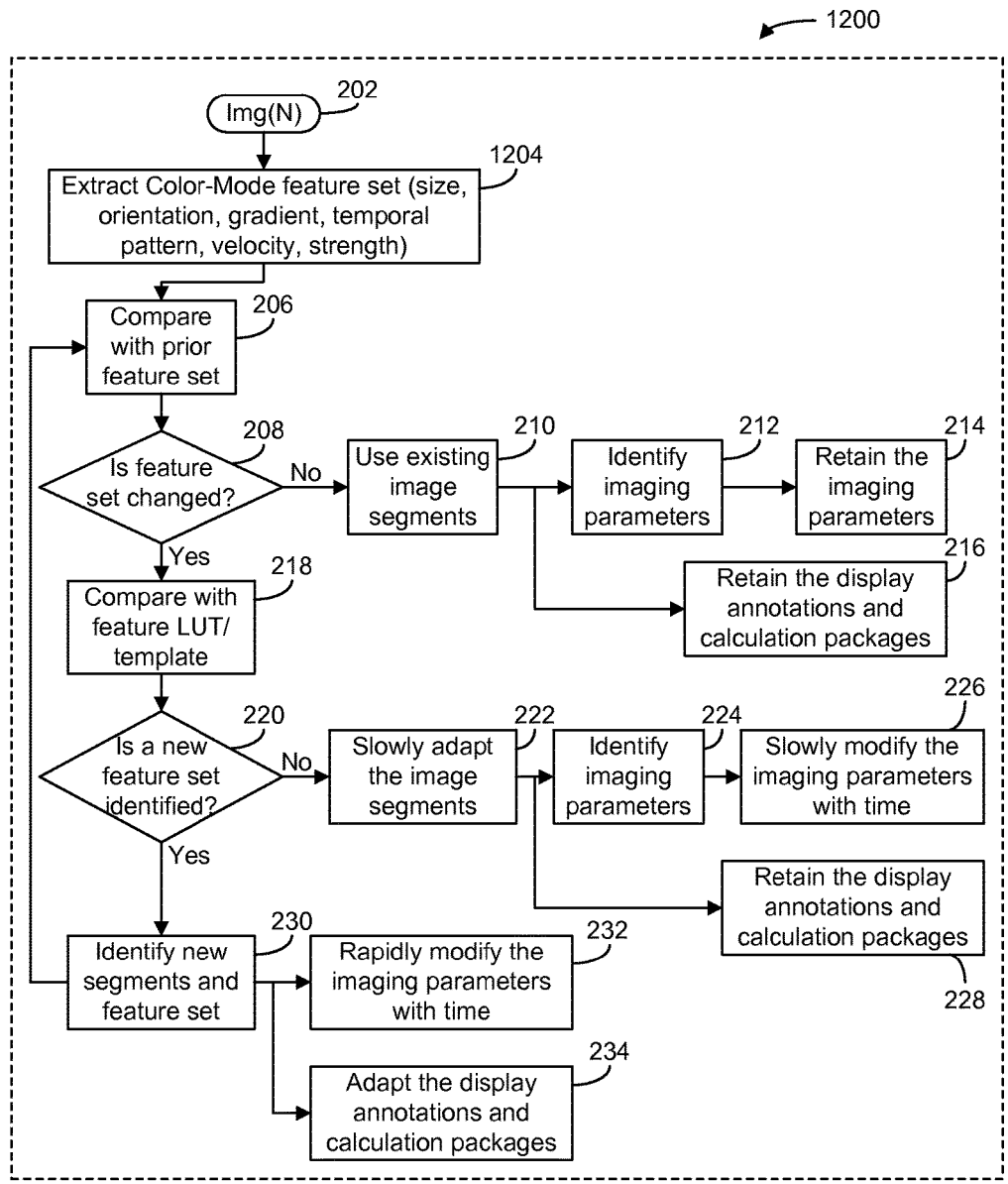
FIG. 12 is a flowchart of a method of dynamic image segmentation for Color Mode processing, according to one embodiment.
Figure 13:
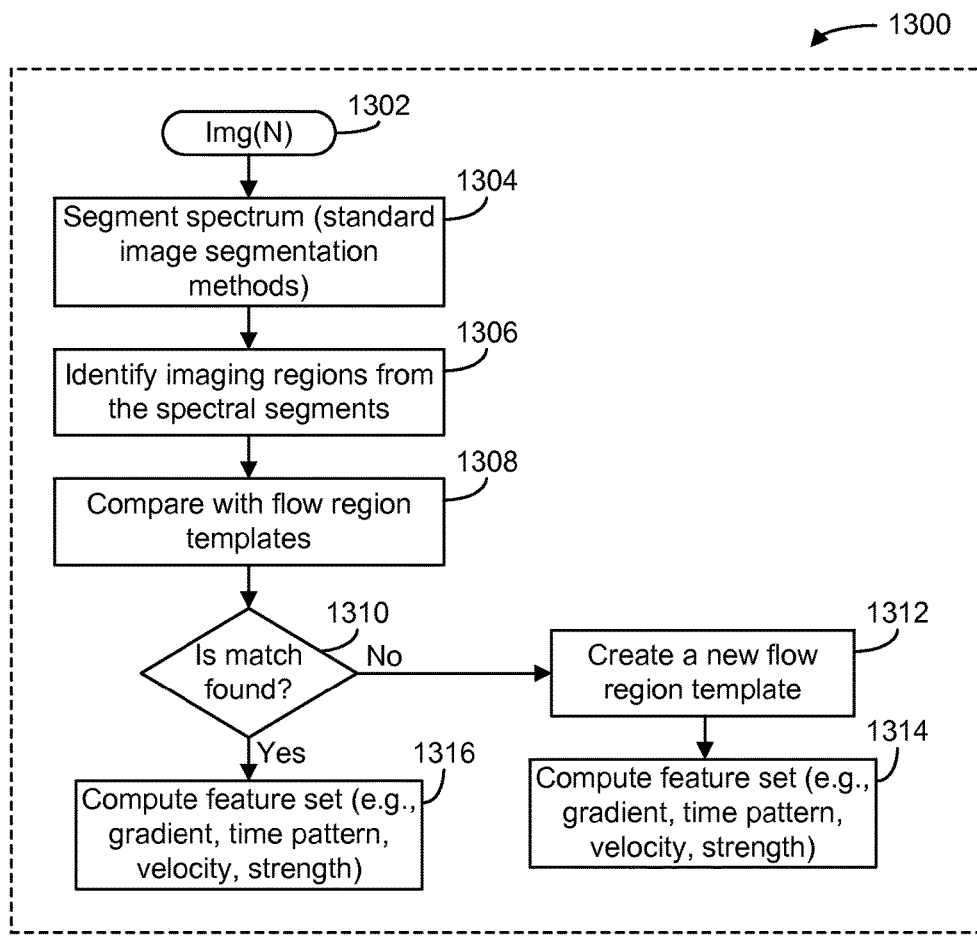
FIG. 13 is a flowchart of a method of extracting feature sets for PW-mode imaging, according to one embodiment.
Figure 14:
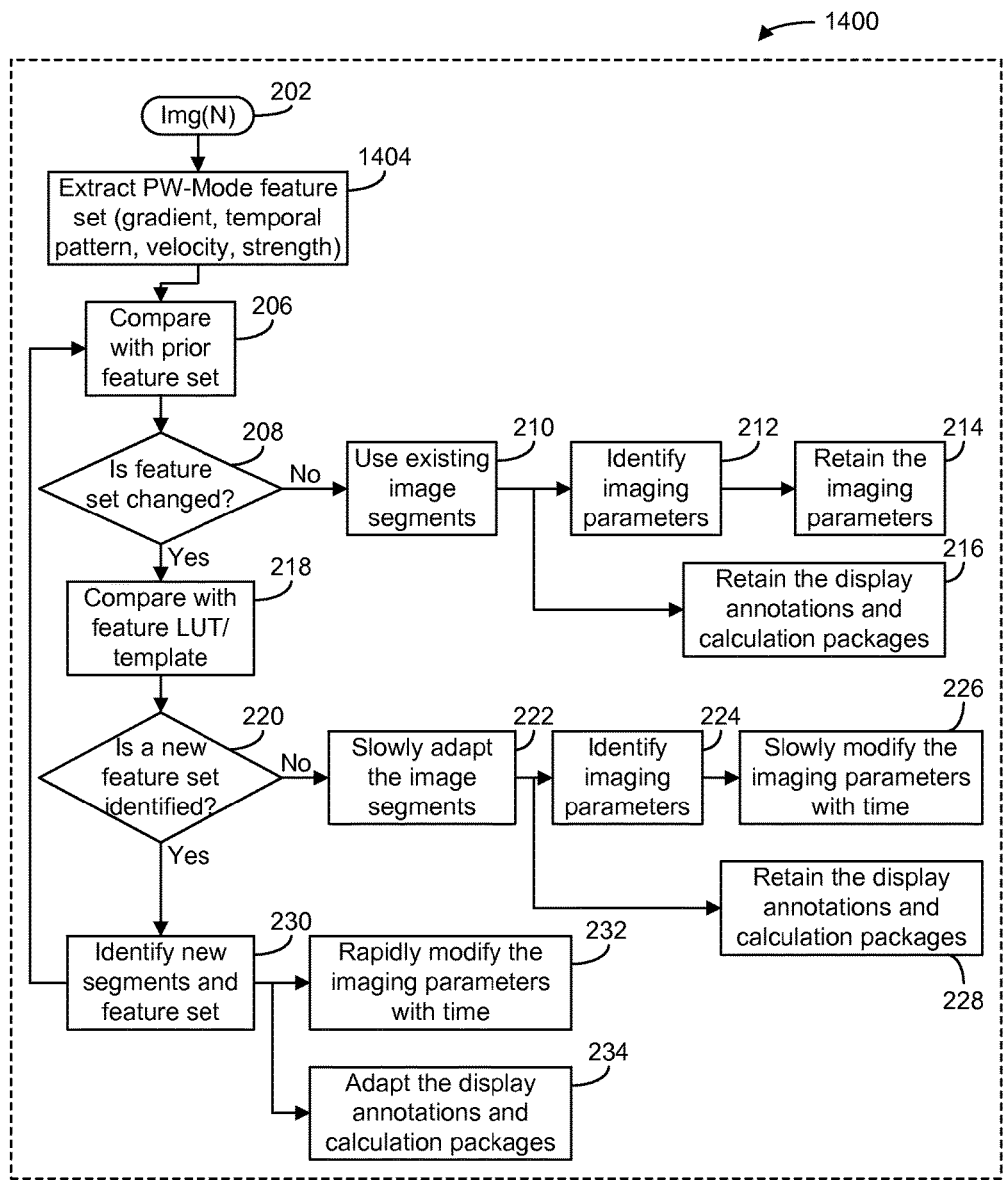
FIG. 14 is a flowchart of a method of dynamic image segmentation for PW-Mode processing, according to one embodiment.

As mentioned above, the generic method 200 and the system 100 may be tailored and different for each imaging mode (e.g., B-mode versus Doppler Mode). FIGS. 9-14 depict the various example flowcharts for various imaging modes. The differences between the imaging modes result in the differences to the generic method 200. These are explained herein. FIGS. 9, 11, and 13 depict flowcharts of how feature sets are extracted for B-mode processing (FIG. 9), color mode processing (FIG. 11), and PW-mode processing (FIG. 13). FIG. 10 depicts a method of dynamic image segmentation for B-mode processing, according to one embodiment. FIG. 12 depicts a method of dynamic image segmentation for color mode processing, according to one embodiment. FIG. 14 depicts a method of dynamic image segmentation for PW-mode processing, according to one embodiment. Thus, FIG. 10 follows FIG. 9, FIG. 12 follows FIG. 11, and FIG. 14 follows FIG. 13. FIGS. 9-14 depict the generic method 200 used with the specific imaging modes for ultrasonography systems. As can be appreciated, similar methodologies may be utilized with other ultrasonography imaging modes (e.g., C-mode), with all such variations intended to fall within the spirit and scope of the present disclosure.

Referring now to FIG. 9, a method 900 of extracting feature sets for B-mode imaging is shown. Method 900 is initiated by an image acquisition (process 902). The local brightness and local orientation are computed (process 904). Image segmentation occurs based on the brightness image using standard image segmentation methods (process 906). Image segmentation occurs based on the orientation image using standard image segmentation methods (process 908). While processes 906 and 908 occur consecutively in FIG. 9, they may occur in parallel, or in another order. The imaging regions are identified using the brightness and orientation segments from processes 906 and 908, respectively (process 910). These regions are then compared with region templates that have been established (process 912). These region templates can be developed from prior imaging sets, user defined templates, or another form of region template. At process 912, the processing circuit 110 may use one or more algorithms, processes, formulas, and the like to determine a degree of similarity between the regions. At process 914, a determination is made whether the region matches a template. This determination may be based on the degree of similarity between the region and the template. For example, if the brightness content at particular locations are within five percent of each other, the processing circuit 110 may determine that the region has not changed. However, if the local gradients differ by more than ten percent at particular locations, the processing circuit 110 may determine that the region has changed. The specification of whether there is a match for the region is highly configurable. In some embodiments, the determination is based on one image characteristics (e.g. brightness or orientation). In other embodiments, the determination is based on a plurality of image characteristics (e.g. brightness and orientation). Due to its high configurability, this process may differ for different applications (e.g. different locations on the body). All such variations are intended to fall within the spirit and scope of the present disclosure.

If the region does not match a region template, a new region template is created (process 916). The feature set can then be computed (process 918). FIG. 10 depicts the process following feature set computation.

If the region matches a region template, the feature set can be computed (process 920). FIG. 10 depicts the process following feature set computation.

As mentioned above, FIG. 10 follows the generic method 200, with a method 1000 for dynamic image segmentation for B-mode processing. The difference between method 200 and method 1000 is between process 204 and process 1004. The feature sets extracted for B-mode processing in process 1004 may include brightness, speckle content, area and shape.

Referring now to FIG. 11, a method 1100 of extracting feature sets for Color Mode imaging is shown. Method 1100 is initiated by an image acquisition (process 1102). Image segmentation occurs based on the velocity image using standard image segmentation methods (process 1104). Image segmentation occurs based on the power image using standard image segmentation methods (process 1106). Image segmentation occurs based on the multitude of velocity images using standard image segmentation methods (process 1108). Image segmentation occurs based on the multitude of power images using standard image segmentation methods (process 1110). While processes 1104, 1106, 1108, and 1110 occur consecutively in FIG. 11, they may occur in parallel, or in another order. The imaging regions are identified using the velocity and power segments from processes 1104, 1106, 1108, and 1110 (process 1112). These regions are then compared with flow region templates that have been established (process 1114). These flow region templates can be developed from prior imaging sets, user defined templates, or another form of flow region template. At process 1114, the processing circuit 110 may use one or more algorithms, processes, formulas, and the like to determine a degree of similarity between the regions. At process 1116, a determination is made whether the region matches a flow region template. This determination may be based on the degree of similarity between the region and the flow region template. For example, if the velocities at particular locations are within five percent of each other, the processing circuit 110 may determine that the region has not changed. However, if the powers differ by more than ten percent at particular locations, the processing circuit 110 may determine that the region has changed. The specification of whether there is a match for the region is highly configurable. In some embodiments, the determination is based on one image characteristics (e.g. velocity or power). In other embodiments, the determination is based on a plurality of image characteristics (e.g. velocity and power). Due to its high configurability, this process may differ for different applications (e.g. different locations on the body). All such variations are intended to fall within the spirit and scope of the present disclosure.

If the region does not match a flow region template, a new flow region template is created (process 1118). The feature set can then be computed (process 1120). FIG. 12 depicts the process following feature set computation.

If the region matches a flow region template, the feature set can be computed (process 1122). FIG. 12 depicts the process following feature set computation.

As mentioned above, FIG. 12 follows the generic method 200, with a method 1200 for dynamic image segmentation for Color-Mode processing. The difference between method 200 and method 1200 is between process 204 and process 1204. The feature sets extracted for Color-Mode processing in process 1204 may include size, orientation, gradient, velocity, and strength.

Referring now to FIG. 13, a method 1300 of extracting feature sets for PW-mode imaging is shown. Method 1300 is initiated by an image acquisition (process 1302). Image segmentation occurs based on the spectral image using standard image segmentation methods (process 1304). The imaging regions are identified using the spectral segment from process 1304 (process 1306). These regions are then compared with flow region templates that have been established (process 1308). These flow region templates can be developed from prior imaging sets, user defined templates, or another form of flow region template. At process 1308, the processing circuit 110 may use one or more algorithms, processes, formulas, and the like to determine a degree of similarity between the regions. At process 1310, a determination is made whether the region matches a flow region template. This determination may be based on the degree of similarity between the region and the flow region template. For example, if the spectrums at particular locations are within five percent of each other, the processing circuit 110 may determine that the region has not changed. However, if the spectrums differ by more than ten percent at particular locations, the processing circuit 110 may determine that the region has changed. The specification of whether there is a match for the region is highly configurable. Due to its high configurability, this process may differ for different applications (e.g. different locations on the body). All such variations are intended to fall within the spirit and scope of the present disclosure.

If the region does not match a flow region template, a new flow region template is created (process 1312). The feature set can then be computed (process 1314). FIG. 14 depicts the process following feature set computation.

If the region matches a flow region template, the feature set can be computed (process 1316). FIG. 14 depicts the process following feature set computation.

As mentioned above, FIG. 14 follows the generic method 200, with a method 1400 for dynamic image segmentation for PW-Mode processing. The difference between method 200 and method 1400 is between process 204 and process 1404. The feature sets extracted for PW-Mode processing in process 1404 may include gradient, temporal pattern, velocity, and strength.

The present disclosure contemplates methods, systems, and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed:

1. An ultrasound processing system, comprising:
an ultrasound interface that receives ultrasound imaging information;
processing electronics coupled to the ultrasound interface and configured to utilize the ultrasound imaging information to process an ultrasound scene for display, wherein the processing electronics parse the scene into segments based on a plurality of automatically detected image characteristics, wherein the processing electronics dynamically assigns different processing parameters to different segments, and wherein the processing electronics are configured to adapt each segment dynamically based on a rate of change of the automatically detected image characteristics for each segment, wherein each image segment is dynamically adapted at a relatively slower rate for a previously identified feature set, and wherein each image segment is dynamically adapted at a relatively faster rate for a feature set not previously identified; and
display electronics coupled to the processing electronics, the processing electronics configured to cause the display electronics to output the processed ultrasound scene.

2. The ultrasound processing system of claim 1, wherein the processing electronics are configured to update the identification of the segments and the different processing parameters.

3. The ultrasound processing system of claim 1, wherein the detected image characteristics utilized to determine the segmentation are not received via a user interface.

4. The ultrasound processing system of claim 1, wherein the segments are identified using the plurality of automatically detected image characteristics by evaluating multiple regions of the ultrasound scene.

5. The ultrasound processing system of claim 1, wherein the segments are identified based on automatically detected image characteristics including at least two of local gradient, local brightness, tissue area, tissue shape and speckle content.

6. The ultrasound processing system of claim 1, wherein the segments are identified based on automatically detected image characteristics including at least two of flow direction, flow size, flow gradients, flow velocity and flow strength.

7. The ultrasound processing system of claim 1, wherein the automatic detection of image characteristics comprises at least one of a Gabor transform, an morphological image analysis, an image frequency domain processing, and a wavelet transform.

8. The ultrasound processing system of claim 1, wherein the different processing parameters assigned to different segments comprise at least one of: (a) dynamic range, (b) motion compensated persistence, (c) spatial filtering, (d) flow adaptive thresholding, (e) spatial smoothing, and (f) noise compensation.

9. The ultrasound processing system of claim 1, wherein the segmentation is performed by computing imaging features for a segment from which tissue types are discerned.

10. The ultrasound processing system of claim 1, wherein the system further comprises a user interface separate from the ultrasound interface, and wherein the processing electronics are configured to search for a segment including a dominant tissue of interest using input received via the user interface.

11. The ultrasound processing system of claim 1, wherein the processing electronics are configured to conduct the automatic image characteristic detection, the segmentation of the scene, and the application of different processing parameters to different segments a plurality of times during an ultrasound viewing session.

12. The ultrasound processing system of claim 1, wherein the processing electronics are configured to characterize an anatomical feature based on the segmentation, and wherein the processing electronics are configured to store or cause the display of an indication of the anatomical feature.

13. The ultrasound processing system of claim 12, wherein the results of the segmentation and/or the anatomical feature characterization are utilized to populate at least one of a database stored in memory and a user interface field that would otherwise be manually populated.

14. The ultrasound processing system of claim 13, wherein the stored or populated fields comprise at least one of position, size, steer, gate size and region of interest quantification.

15. An ultrasound machine comprising:
an ultrasound engine configured to receive ultrasound returns representative of an ultrasound scene for display; and
an ultrasound processor configured to detect characteristics of different portions of a scene and to assign different segment tags to the different portions, wherein the ultrasound processor causes a display output to be generated after applying different processing to the different portions of the scene based on the segment tags and adapts each segment dynamically based on a rate of change for a feature set of each segment, wherein each image segment is dynamically adapted at a relatively slower rate for a previously identified feature set, and wherein each image segment is dynamically adapted at a relatively faster rate for a feature set not previously identified.

16. A method of dynamic image segmentation for ultrasonography images, the method comprising:
receiving an ultrasonography image;
segmenting the ultrasonography image based on one or more features of the ultrasonography image, wherein each segment of the image corresponds with a feature set;
applying an imaging parameter to each segment based on the feature set of each segment, wherein the imaging parameter is configured to enhance each image segment by reducing an amount of noise associated with each segment; and
adapting each image segment dynamically based on a rate of change for the feature set of each segment, wherein each image segment is dynamically adapted at a relatively slower rate for a previously identified feature set, and wherein each image segment is dynamically adapted at a relatively faster rate for a feature set not previously identified.

17. The method of claim 16, wherein the segmenting is based on at least one of a wavelet, a Gabor transform, a morphological image processing, and an image frequency domain processing.

18. The method of claim 16,
wherein the segmentation includes a tissue type segmentation and a flow type segmentation;
wherein the flow type segmentation is based on a flow size feature, a flow gradient feature, a flow time pattern feature, a flow velocity feature, a flow direction feature, and a flow strength feature; and wherein the tissue type segmentation is based on a regional area feature, a regional shape feature, a structure brightness feature, and a structure speckle content feature.

19. The method of claim 16, wherein the imaging parameter includes a dynamic range, a persistence, and a spatial filter.

* * * * *